United States Patent [19]

Ordemann

[11] 3,912,039
[45] Oct. 14, 1975

[54] BICYCLE DRIVE APPARATUS

[76] Inventor: Connie R. Ordemann, Rte. No. 1, Box 353B, Shakopee, Minn. 55379

[22] Filed: July 26, 1974

[21] Appl. No.: 492,224

[52] U.S. Cl. .................. 180/33 D; 74/194; 180/31; 180/33 C; 180/74
[51] Int. Cl.² .................. B60K 17/30; B60K 17/06
[58] Field of Search ........ 180/31, 33 R, 33 C, 33 D, 180/33 E, 26 R, 74, 70 R; 74/194, 196

[56] References Cited
UNITED STATES PATENTS

| | | | |
|---|---|---|---|
| 1,811,465 | 6/1931 | Geloso | 74/194 X |
| 2,586,082 | 2/1952 | Piatti | 180/33 D |
| 3,439,926 | 4/1969 | Bayard | 180/74 X |
| 3,496,943 | 2/1970 | Mueller et al. | 74/194 X |

FOREIGN PATENTS OR APPLICATIONS

| | | | |
|---|---|---|---|
| 714,429 | 11/1941 | Germany | 180/33 D |
| 79,412 | 5/1955 | Netherlands | 180/31 |
| 873,803 | 3/1953 | Germany | 180/74 |
| 27,138 | 5/1932 | Netherlands | 180/74 |

Primary Examiner—Kenneth H. Betts
Assistant Examiner—John P. Silverstrim
Attorney, Agent, or Firm—Paul L. Sjoquist

[57] ABSTRACT

Apparatus is disclosed for attachment to a bicycle frame and wheel for providing a motorized drive to assist the normal bicycle pedal action in propelling the bicycle. The apparatus comprises a movable power source engageable against a conical drive plate attached to the wheel spokes, wherein the drive source may be moved to provide a variable drive power ratio.

7 Claims, 4 Drawing Figures

U.S. Patent  Oct. 14, 1975  Sheet 2 of 2  3,912,039
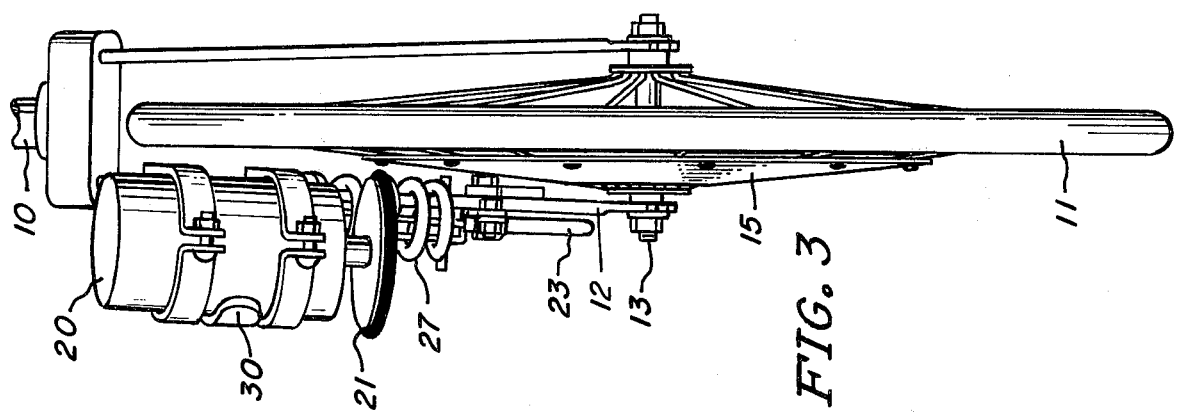
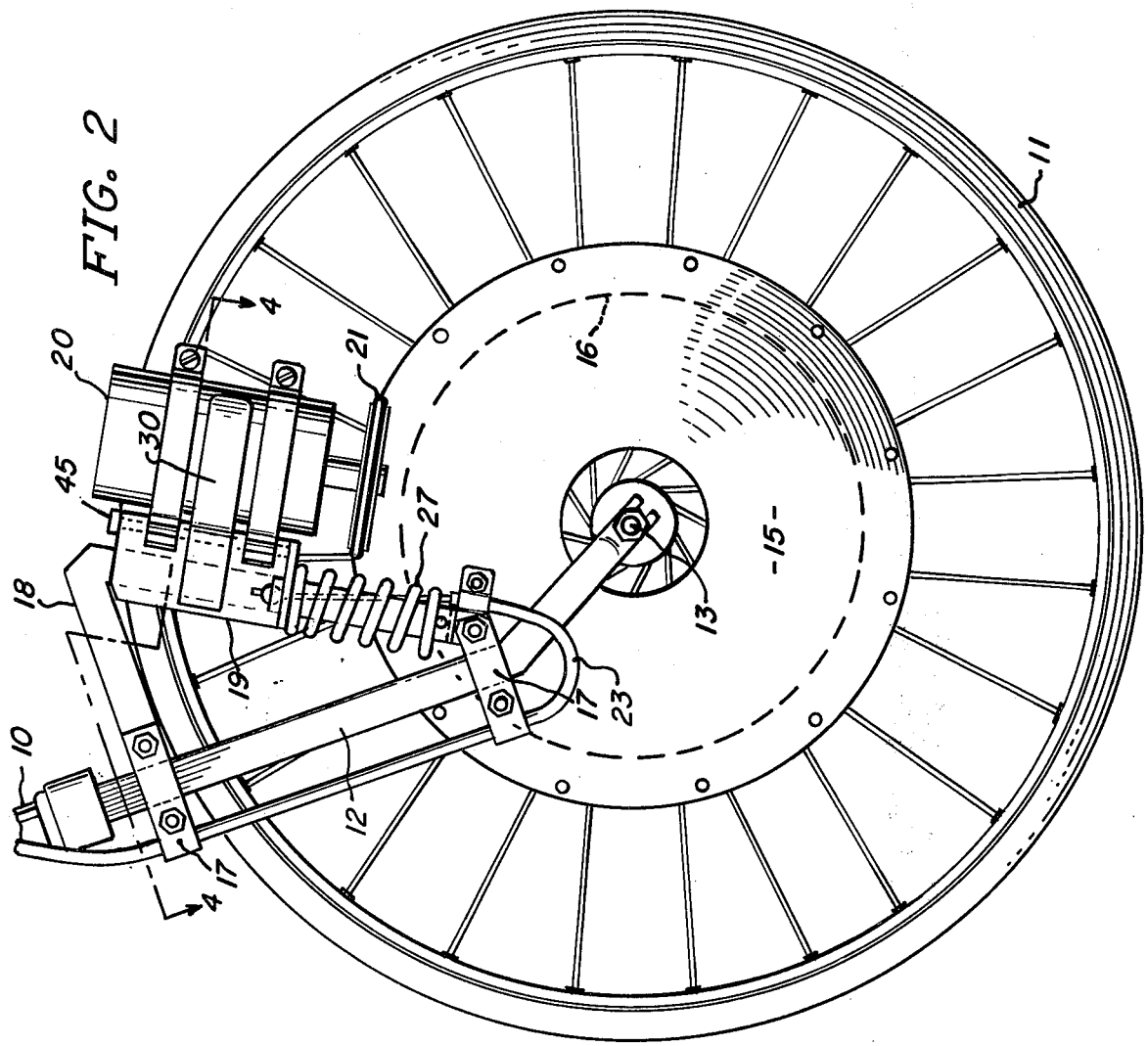

BICYCLE DRIVE APPARATUS

This invention relates to an apparatus for providing a motorized drive to a bicycle or other lightweight vehicle. The invention is intended for clamping onto an existing bicycle frame and for attachment to a bicycle wheel in a manner which will not interfere with the operation of the bicycle when the invention is decoupled from its driving relationship against the wheel.

The prior art shows a great many devices for providing a motorized drive means for bicycles. These devices are principally driven by gasoline engine drive sources which are coupled to the bicycle wheels by various mechanical connection schemes. For example, some devices have coupled the engine rotary shaft motion directly to the bicycle wheel itself, while others have used belt and pully combinations to transmit the rotary engine torque to the bicycle wheel or axle. Some devices have required interconnection with the existing bicycle chain drive mechanism to provide either a replacement motorized drive source or a supplementary drive, which operates in conjunction with the existing bicycle pedal drive.

The present invention is primarily intended to supplement the existing bicycle pedal drive, and is controllably actuated by means of a lever control on the bicycle handle bars. When the invention is disengaged the bicycle is operable in its conventional manner, but the invention may be engaged at any time to supplement or replace the pedal drive force provided by the rider. The invention may be connected to any bicycle without affecting in any way the normal operation thereof, and may be subsequently removed from the bicycle without necessitating repair or replacement of any bicycle equipment.

Accordingly, it is an object of this invention to provide a motorized drive apparatus which is readily added to or removable from an existing bicycle;

It is another object of this invention to provide a drive apparatus which does not impair the existing bicycle drive mechanism;

It is another object of this invention to provide a bicycle drive source having a variable drive power and speed ratio;

It is yet another object of this invention to provide a drive apparatus which can supplement the existing bicycle drive mechanism;

A further object of this invention is to provide a bicycle drive apparatus which may be conveniently attached and removed from a bicycle without impairing the operation of the bicycle.

These and other objects will become evident upon the reading of the following specifications and claims, and with reference to the appended drawings, in which:

FIG. 2 illustrates the attachment of a drive motor on a bicyle in operable relationship with the drive plate;

FIG. 3 illustrates a front view of the invention mounted on a bicycle;

Figure 1:
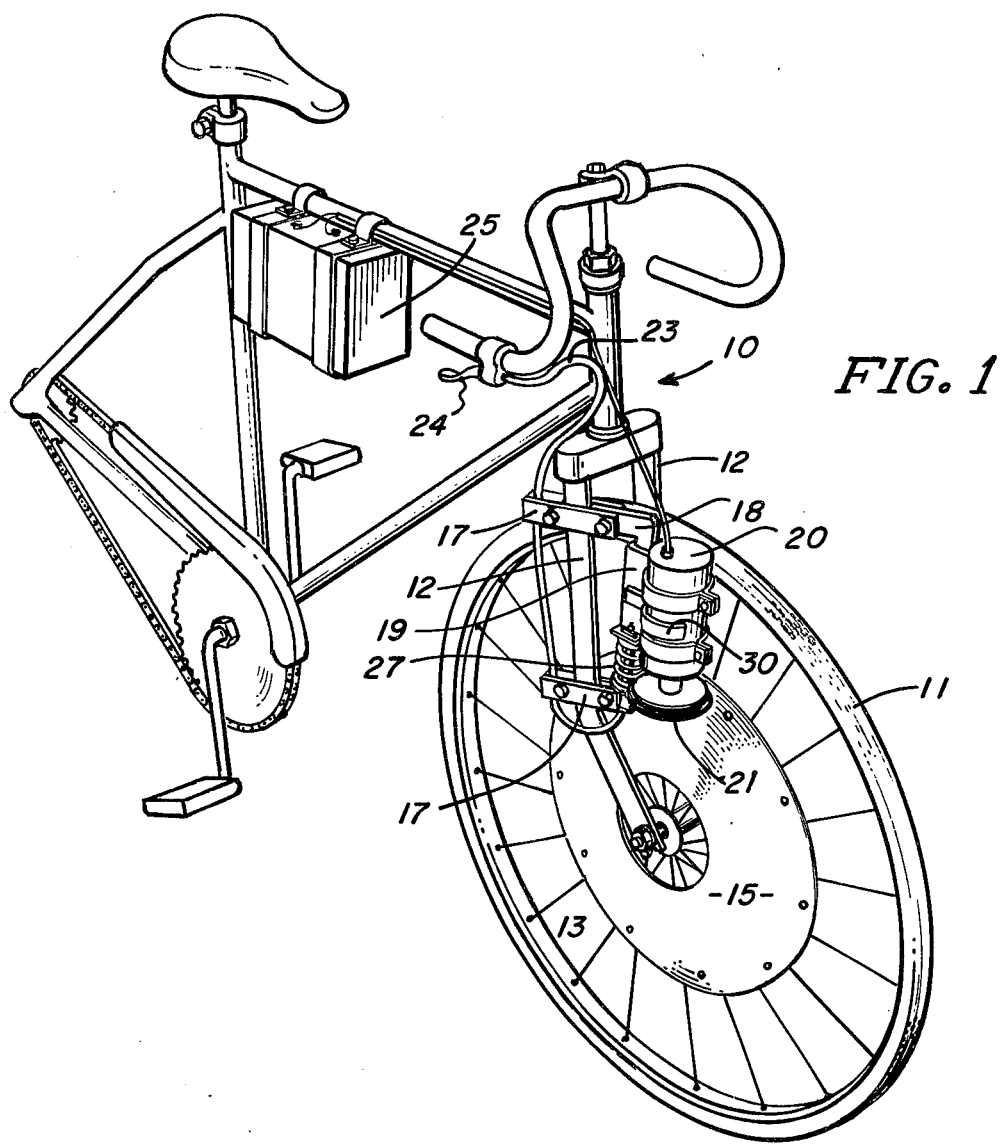
FIG. 1 illustrates a typical attachment of the invention on a bicyle.

Referring first to FIG. 1, the invention is shown in typical attachment relationship on a bicycle. The invention is attached and connected in driving relationship to the front bicycle wheel, although it may equally well be applied to the rear bicycle driving wheel. For purposes of explaining the operation and construction details of the invention, reference throughout will be made to a front wheel connection, it being understood that the invention could equally well be adapted to drive the rear bicycle wheel.

The bicycle 10 has a wheel 11 attached thereto by means of fork 12. These are conventional bicycle components which are unmodified in any way except for the attachment of the parts of the invention as will be described herein. A drive plate 15 is attached to the wheel spokes in a position as illustrated in FIG. 1. A motor clamp 17 is fixedly bolted to the fork 12, and has a motor 20 slideably attached thereon. Motor 20 has a drive wheel 21 attached to its shaft, and is engagable against drive plate 15. A control cable 23 connects to motor 20 and controllably slides motor 20 along the bracket held by clamp 17. Control cable 23 is operable by means of handlebar lever 24. The motor 20 is powered by means of a battery power source 25 which may be fastened to the bicycle at any convenient location. FIG. 1 illustrates battery power source 25 attached beneath the horizontal bicycle frame, although it may also be connected to any other bicycle member, in any of a number of positions.

FIG. 1 and subsequent figures show the inventive embodiment as being an electric drive motor powered by a battery power source. This represents the preferred embodiment of the invention, although other power sources are equally applicable. For example, the inventive apparatus can equally well be driven by means of a small, lightweight gasoline engine attached in the manner described herein. The gasoline engine is used as the power source, the mounting position selected for the battery power source can equally apply as a mounting postion for a gasoline tank. It should therefore be presumed throughout this specification that the power source described for use with this invention may be any of known power drive devices, and the inventive scope is not merely restricted to electrical drive apparatus. It would also be possible to mount the drive source at a location remote from the bicycle wheel, and transmit the rotary power to wheel 21 by means of a flexible cable or shaft.

FIG. 2 illustrates the attachment of the drive plate 15 on a bicycle wheel 11, and the operable position of motor 20. Drive plate 15 is a cone-shaped circular plate which is clamped to the wheel spokes by suitable clamping devices. Drive plate 15 is installed on the bicycle wheel by first removing the wheel from fork 12 and then centering drive plate 15 about axle 13 and laying it over the wheel spokes. A split clamping ring 16 is then positioned adjacent the interior edges of the spokes and suitable fastening screws are used to bolt the clamping ring 16 to drive plate 15 with the wheel spokes intermediate the clamping ring and drive plate. When the clamping ring 16 has been securely attached to drive plate 15, the drive plate forms a rigid drive surface against which the motor drive wheel may be engaged. The cone shape of drive plate 15 generally conforms to the bicycle wheel dimensions. An edge-wise view of the bicycle spokes (FIG. 3) shows that they generally form a conical surface from the wheel axle 13 to the wheel rim, because the axle has a wider dimension than does the rim. Therefore, when drive plate 15 is clamped to these spokes it generally conforms to this conical shape.

The diameter of drive plate 15 may be varied according to the power and speed capabilities of the motor drive and also according to the desired speed assist to be imported to the bicycle. If drive plate 15 is made having an outer diameter range of from 8 inches to 16 inches the invention will operate successfully for most practical combinations of motor drive capabilities and speed assist needs. It is obvious that the larger the diameter of drive plate 15, the greater is the low-speed, high-power assist capability of the invention.

FIG. 2 also illustrates the apparatus for attaching the drive motor 20 to the bicycle fork 12. A U-bracket 18, of generally square of rectangular cross-section, is clamped to fork 12 by means of clamps 17. Motor 20 is slideably attached to bracket 18 by means of sleeve assembly 19. Sleeve assembly 19 has at least one sleeve which is complementary-shaped to bracket 18 and is slideable over the surface of the longest member of bracket 18. Sleeve assembly 19 is biased upwardly along the length of bracket 18 by means of compression spring 27. Spring 27 serves to disengage motor drive wheel 21 from contact with drive plate 15 when the invention is not being used to assist in propelling the bicycle. Control cable 23, one end of which is connected to sleeve assembly 19, is used to pull sleeve assembly 19 downwardly against the force of spring 27, and thereby to bring motor drive wheel 21 into engagement with drive plate 15. Control cable 23 is attached to a suitable lever 24 mechanism on the bicycle handlebar or frame, at a point where the bicycle operator can conveniently manipulate this lever.

A second spring 30 urges against motor 20 to force it inwardly toward the bicycle wheel. Spring 30 may be a torsion spring or leaf spring such as may be found suitable for this purpose. A mechanical stop limits the inward travel of motor 20, but spring 30 operates within this limited range to assure that motor drive wheel 21 bears against drive plate 15 with sufficient force to prevent slippage of the drive wheel over the surface of drive plate 15.

FIG. 3 illustrates, in front view, the position of motor 20 when drive wheel 21 is disengaged from drive plate 15. This occurs when control cable 23 is released to allow spring 27 to urge motor 20 upwardly and away from contact with drive plate 15. Because of the conical shape of drive plate 15 the upward movement of motor 20 eventually reaches a point where drive wheel 21 no longer comes into contact with drive plate 15.

Figure 4:
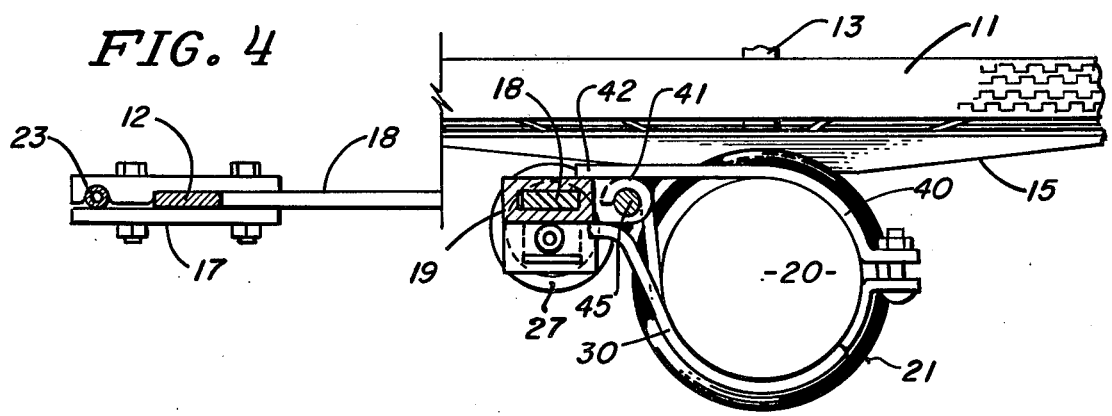
FIG. 4 illustrates the section 4—4 of FIG. 2.

Motor 20 is clamped and pivotally mounted to sleeve 19 by means of clamps 40. The mounting arrangement for one of these clamps is shown in FIG. 4. Clamp 40 has two halves welded together at point 41 to form a single clamp which is pivotable about rod 45. An end 42 of clamp 40 extends in abutting relationship to sleeve 19, to limit the inward movement of the motor 20 and clamps 40 so that drive wheel 21 is held away from contacting the bicycle spokes. This limitation on inward movement occurs when control cable 23 is released and motor 20 is in its uppermost position on bracket 18.

In operation, so long as the bicycle rider does not manipulate lever 24 the motor drive wheel 21 remains disengaged from drive plate 15. When the rider desires to implement the motor drive assit he moves lever 24 to a closed, or partially closed, position. If the lever is only partially closed the motor drive wheel 21 will contact drive plate 15 along an outer radius and the motor drive will provide a low-speed drive assist. If the lever is fully closed the motor drive wheel 21 will contact drive plate 15 along an inner radius and the motor drive will provide a high-speed drive assist. In this manner, the rider may select the speed at which a motor power assist is desired. Because the rider has the flexibility to select any drive speed ratio by manipulating lever 24, it is possible for motor 20 to be a constant speed motor, with or without auxiliary speed adjustment capability.

This invention is intended for providing assistance to a bicycle rider in propelling the bicycle. Therefore the motor drive power capability does not need to be sufficient by itself to propel the bicycle over any significant length of time or under adverse riding conditions. If a gasoline engine is used as a motor drive, it should be adequate to utilize an engine having a fractional horsepower rating. Of course, this assumes that the engine performance in revolutions per minute (r.p.m.) and torque delivery is selected to suit the weight and speed requirements of the bicycle and rider, together with the diameter range chosen for drive plate 15.

Variations of the inventive embodiment described herein may be made within the scope of my invention. For example, other leverage means may be adapted for selecting the radial contact point of drive wheel 21 on drive plate 15, and other forms of spring biasing the various inventive elements may be chosen. It is intended that the foregoing description of a preferred embodiment of my invention be representative of the many detailed design selections which may be employed.

I claim:

1. Apparatus for propelling a bicycle, comprising:
   a. a bracket for clamping to the bicycle fork adjacent a wheel, said bracket having an elongated bearing surface extending generally parallel to said wheel;
   b. a circular drive plate attached to the bicycle wheel adjacent said bracket;
   c. a rotary power source having a drive wheel engageable against said drive plate;
   d. a slideable assembly attached to said bracket and slideable over said bearing surface; and
   e. means for attaching said rotary power source to said slideable assembly, whereby said drive wheel is slideable radially across said circular drive plate to vary the speed at which said bicycle wheel is driven, said means for attaching including a hinged clamp having an axis substantially parallel to said bicycle wheel, and means for biasing said power source inwardly toward said drive plate about said axis.

2. The apparatus as claimed in claim 1, further comprising a first spring biasing means coupled between said bracket and said slideable assembly for urging said slideable assembly radially outward along said bearing surface, relative to said wheel center.

3. The apparatus as claimed in claim 2, wherein said drive plate has a cone shape which generally conforms to the spokes of said wheel.

4. The apparatus as claimed in claim 3, further comprising means for sliding said slideable assembly including a cable extending from said assembly to said bicycle handlebar, and a lever means connected to said cable and said handlebar for exerting tensile force against said cable.

5. The apparatus as claimed in claim 4 wherein said drive plate is of generally circular diameter of dimension from 8 inches to 16 inches.

6. The apparatus of claim 5, further comprising a split ring having a diameter substantially equal to said drive plate diameter, said ring positioned adjacent the inside edges of said wheel spokes and fastened to said drive plate.

7. Apparatus for propelling a bicycle, comprising:
   a. a bracket for clamping to the bicycle fork adjacent a wheel, said bracket having an elongated bearing surface extending generally radially from said wheel center and having clamp means for rigid attachment to said fork;
   b. a motor drive assembly slideably attached to said bracket bearing surface, and having thereon a motor mounting bracket, said motor mounting bracket being hinged for movement toward said wheel over at least a limited distance;
   c. a first spring biasing means coupled between said motor drive assembly and said motor mounting bracket, for biasing said motor mounting bracket toward said wheel;
   d. a cone-shaped drive plate attached to said wheel spokes in centered relationship to said wheel and adjacent said motor drive assembly;
   e. a motor attached to said motor drive assembly, and having a drive wheel attached to its shaft, said drive wheel engageable against the cone-shaped surface of said drive plate;
   f. a second spring biasing means connected between said bracket for clamping to the bicycle fork and said motor drive assembly, for urging said assembly radially outward from said wheel center along said bearing surface; and
   g. means for sliding said motor drive assembly over said bearing surface against the force of said second spring biasing means, said means comprising a cable having a first cable end attached to said motor drive assembly and a second cable end attached to a lever mounted on said bicycle.

* * * * *